W. A. WILLOWER, C. W. ANGELL & J. W. GALLASPIE.
CONTROLLING MECHANISM FOR ELECTRIC LIGHT SIGNS.
APPLICATION FILED AUG. 20, 1913.
1,166,030.
Patented Dec. 28, 1915.
6 SHEETS—SHEET 1.
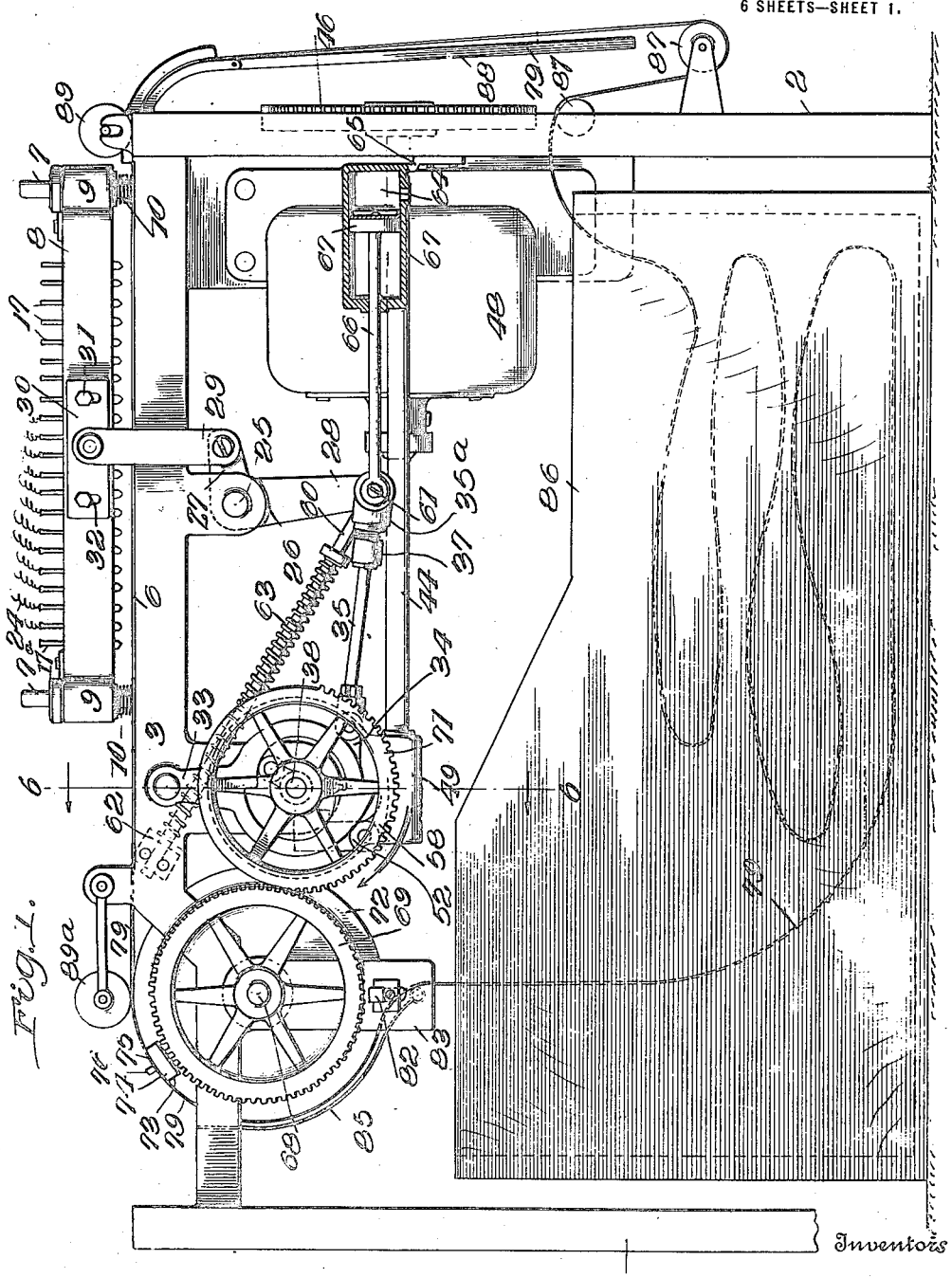

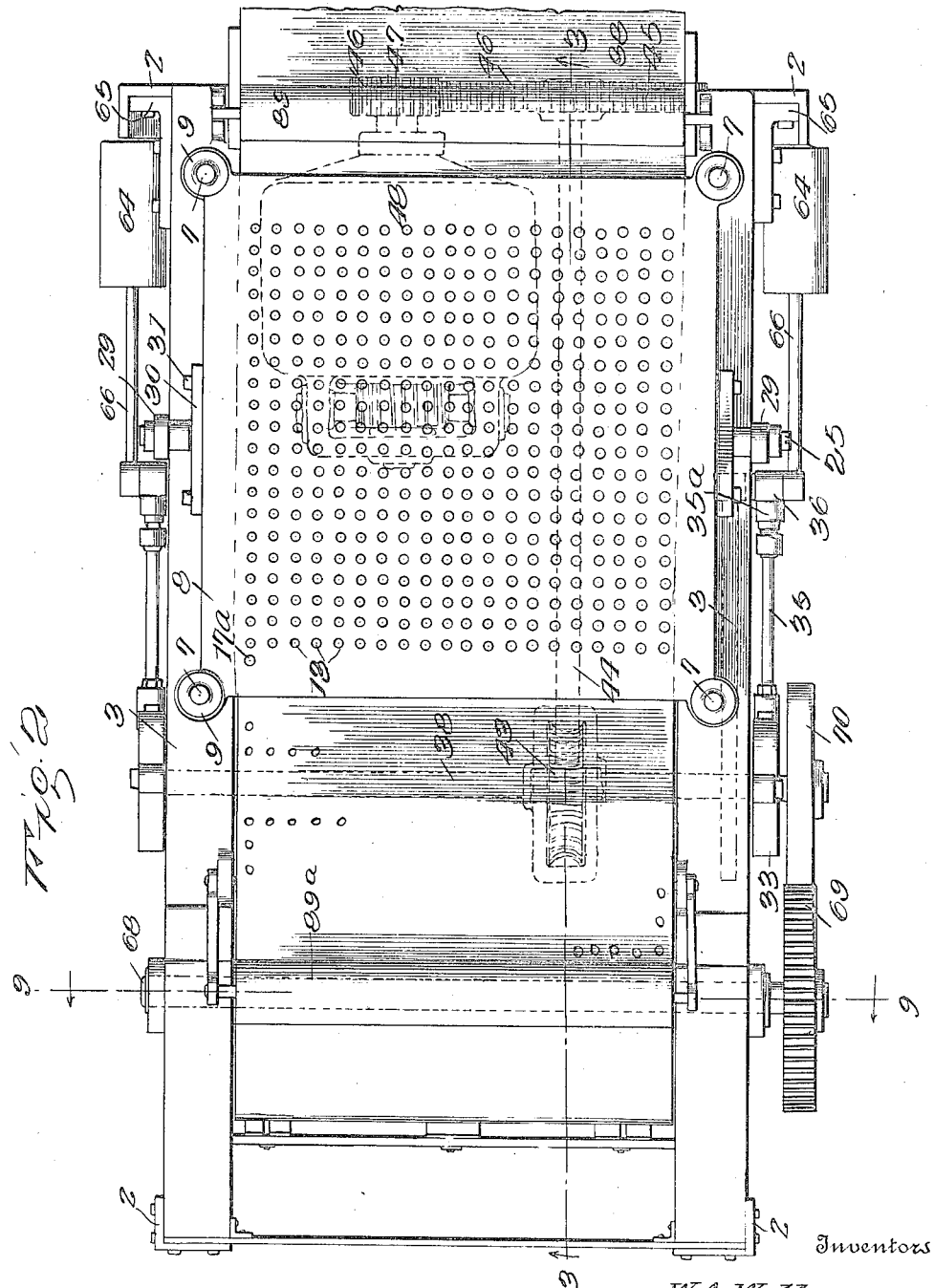

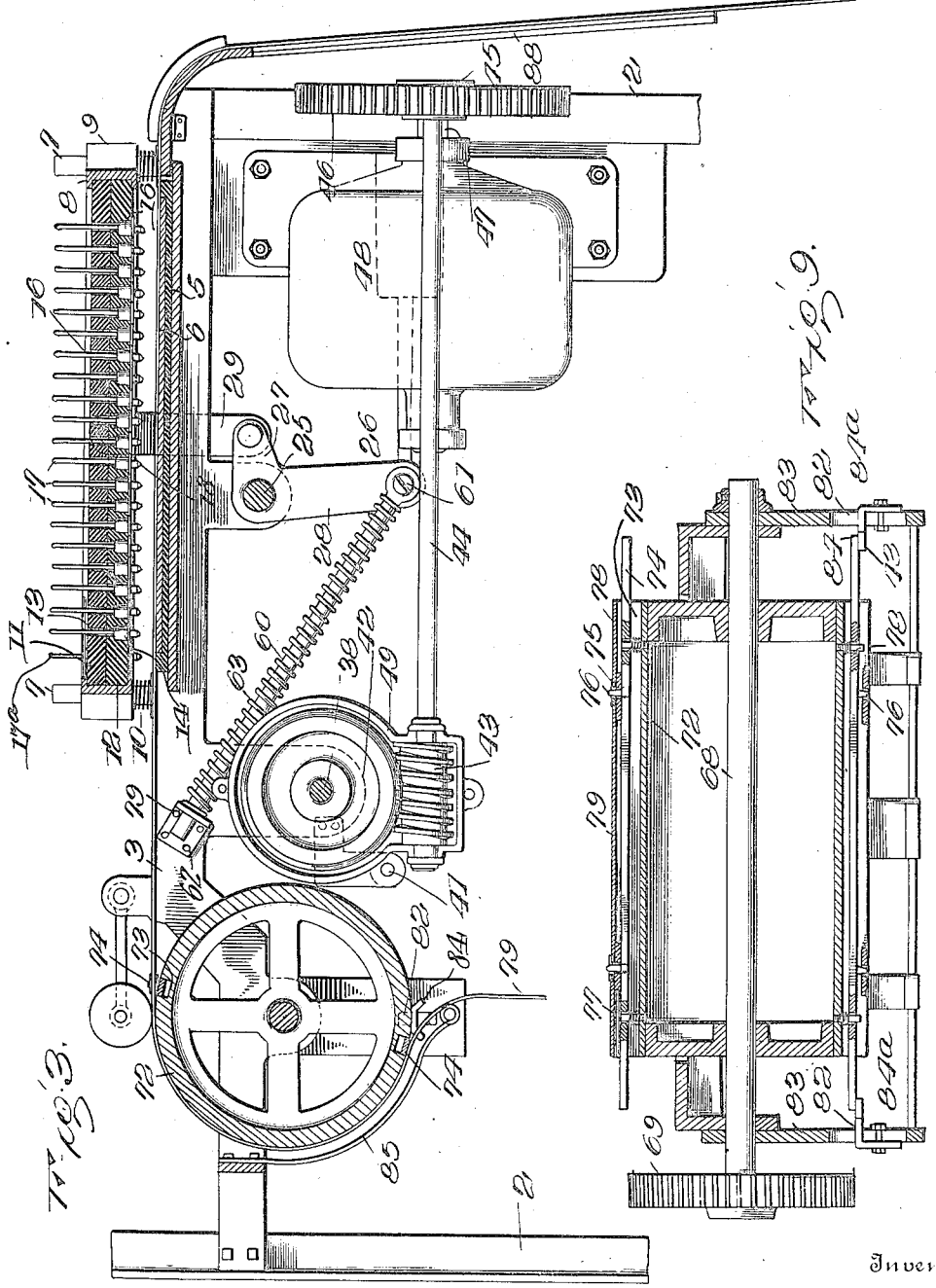

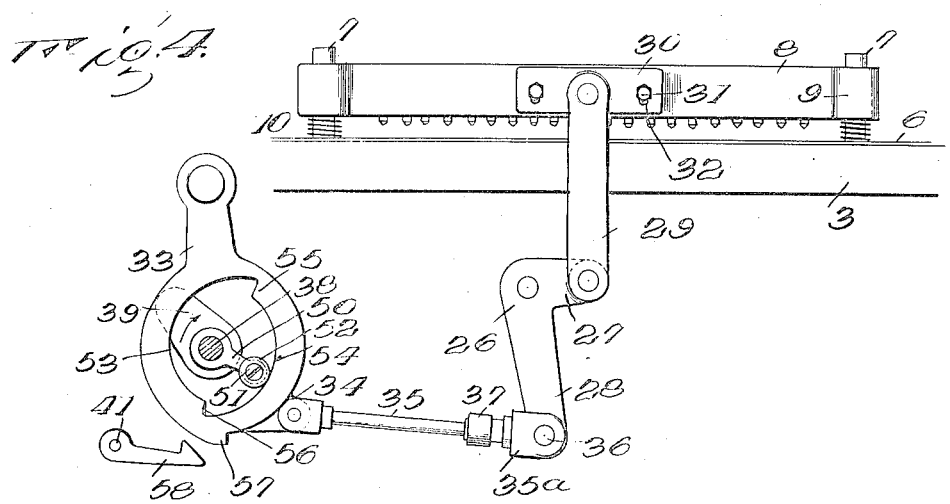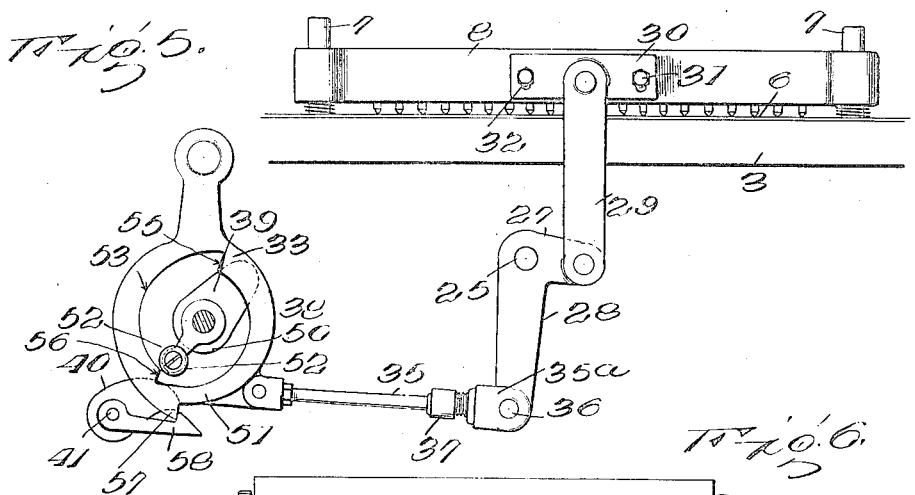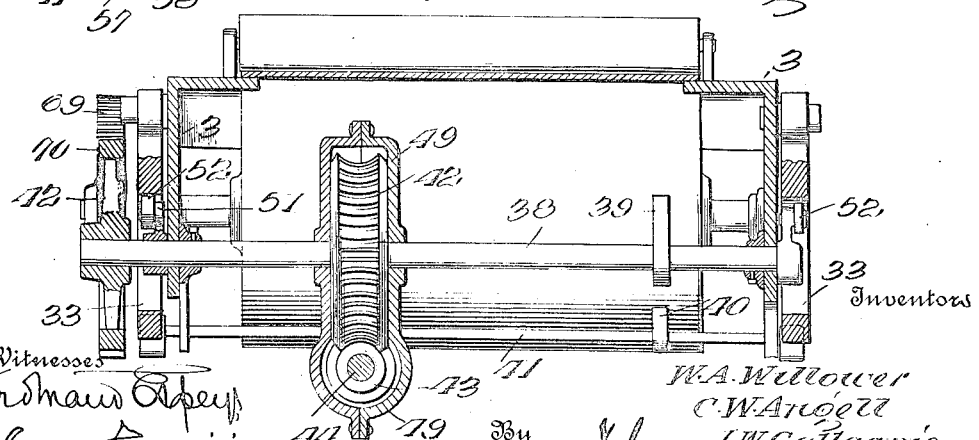

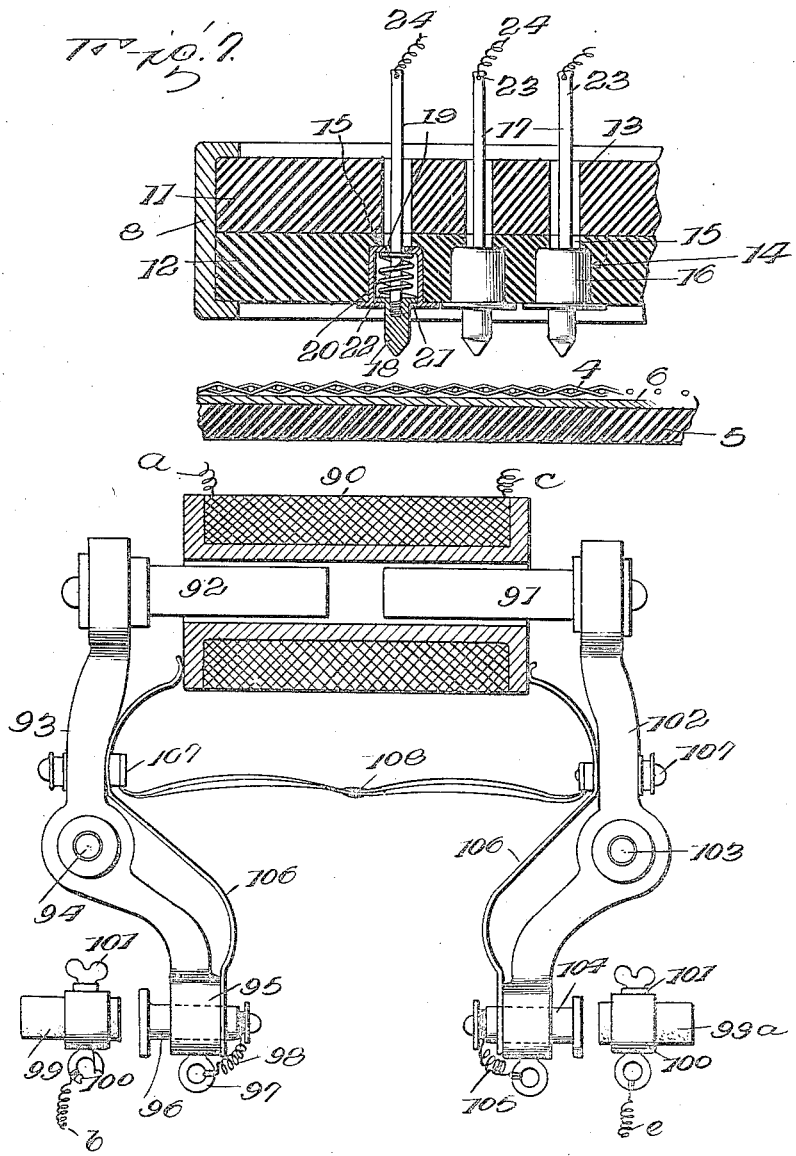

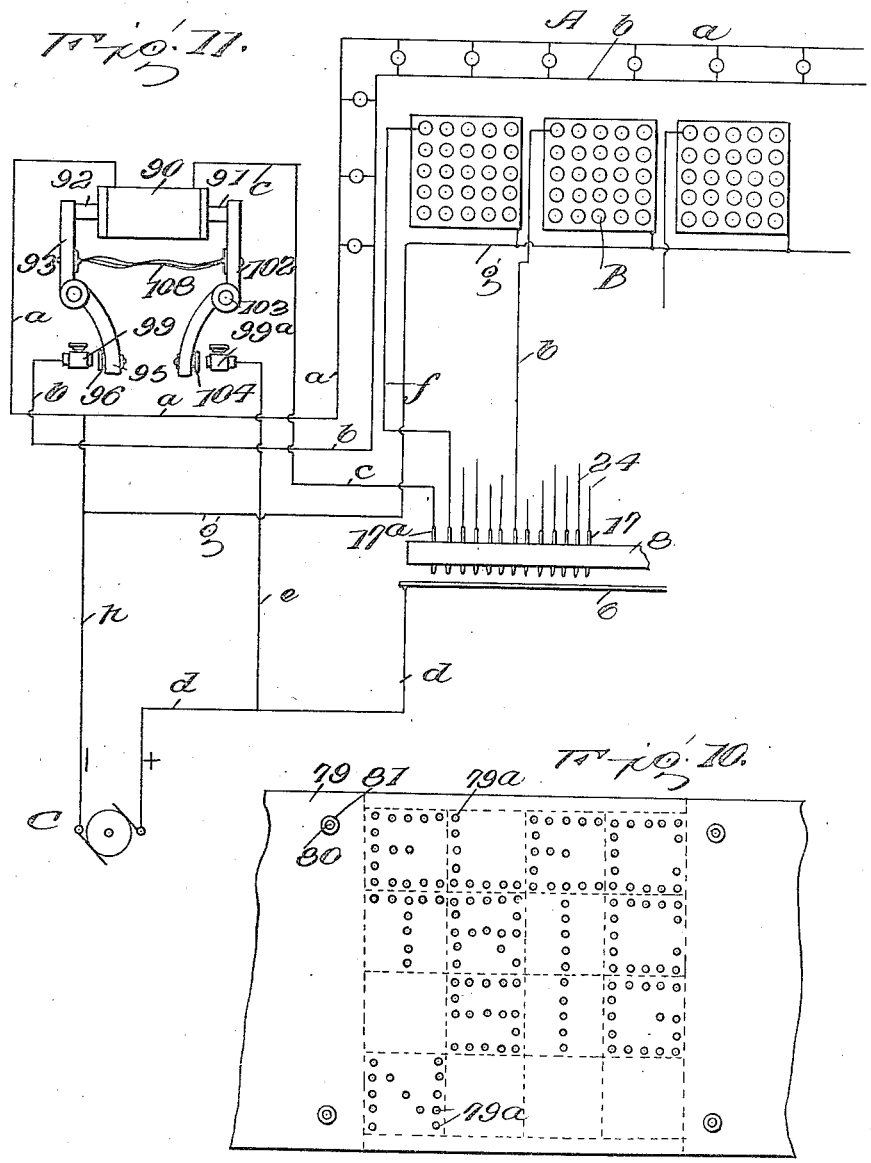

UNITED STATES PATENT OFFICE.

WILBERT A. WILLOWER, CHARLES W. ANGELL, AND JAMES W. GALLASPIE, OF LIMA, OHIO.

CONTROLLING MECHANISM FOR ELECTRIC-LIGHT SIGNS.

1,166,030.   Specification of Letters Patent.   Patented Dec. 28, 1915.

Application filed August 20, 1913. Serial No. 785,801.

*To all whom it may concern:*

Be it known that we, WILBERT A. WIL-LOWER, CHARLES W. ANGELL, and JAMES W. GALLASPIE, citizens of the United States, residing at Lima, in the county of Allen and State of Ohio, have invented certain new and useful Improvements in Controlling Mechanism for Electric-Light Signs, of which the following is a specification.

Our invention relates to electric signs and particularly to the mechanism whereby the circuits through the lamps of the sign are closed or opened and whereby the lamps are flashed or energized in a regular and predetermined way.

The primary object of our invention is the provision of means whereby a perforated sheet may be used for controlling the flashing of the lamps and the provision of mechanism whereby said sheet may be caused to travel through the machine.

A further object of the invention is the provision of a mechanism of this character including confronting contact members connected in normally interrupted circuit with the lamps and the source of power and the provision in conjunction with a perforated lamp controlling sheet, of means for passing the sheet between the contact members.

A further object is the provision with confronting contact members, of a perforated controlling sheet passing between the contact members and means for relatively moving the contact members into and out of engagement with each other and shifting the sheet longitudinally a predetermined distance while the members are out of electrical engagement, whereby to change the sign formed by the electric lamps connected to the contact members.

A further object is to so construct the machine that a quick movement of the contact members away from each other is secured when it is desired to break the circuit through the display lamps, and a further object in this connection is to cushion the machine against the shock incident to said movement.

A still further object of the invention is to provide a border light controlling mechanism in conjunction with the mechanism for controlling the lamps of the sign, so constructed as to permit of closing or opening of a circuit carrying the current for the border lights, this current being much heavier than the current necessary for the sign lights.

A further object is to improve generally the construction of machines of this character so as to secure a positive operation of the same and so as to increase the simplicity of mechanism of this character and decrease its liability to get out of order.

Further objects will appear in the course of the following description.

Our invention is illustrated in the accompanying drawings, wherein;

Figure 1 is a side elevation of a machine constructed in accordance with our invention. Fig. 2 is a plan view of the machine shown in Fig. 1. Fig. 3 is a longitudinal section on the line 3—3 of Fig. 2. Fig. 4 is a fragmentary detail side elevation of the mechanism for shifting the movable contact carrier away from the fixed contact carrier. Fig. 5 is a like view to Fig. 4 but showing the parts in a different position. Fig. 6 is a transverse section through the machine on the line 6—6 of Fig. 1. Fig. 7 is a detail fragmentary section through the movable contact carrier and through the fixed contact carrier. Fig. 8 is an elevation partly in section of the mechanism for controlling the border lights. Fig. 9 is a cross section on the line 9—9 of Fig. 2. Fig. 10 is a view of a portion of the controlling sheet showing the arrangement of perforations thereon. Fig. 11 is an electrical diagram showing the wiring connections between the lamps and the circuit controllers for the letter lamps and the border lamps.

Referring to these drawings it will be seen that our invention comprises a frame including the legs or standards 2 and the side bars 3. This frame may be of any usual or desired form and its particular shape and construction forms no part of the present invention. Disposed across the upper portion of the top of the frame, is a contact member designated 6 which may be made of sheet metal and is preferably made of aluminum, this sheet metal being insulated from the metal of the frame by means of a sheet of wood fiber designated 5 or in any other suitable manner. This aluminum sheet 6 is connected by any suitable electrical connection to a source of current so that the entire sheet is charged. Preferably disposed over the face of the aluminum sheet 6 is a sheet of wire gauze designated 4 and preferably formed of copper.

Disposed upon the frame 3 and extending upward therefrom at each end of the contact member 6 are the pairs of posts 7 and mounted for vertical movement upon these posts is a frame 8 within which the movable contact member is adapted to be supported. This frame as illustrated is rectangular in section and is formed at its corners with the eyes 9 through which the posts 7 pass. Springs 10 are disposed between the under faces of these eyes and the adjacent upper face of the frame and these springs act to urge the frame 8 upward and yieldingly resist any downward movement of the frame. The side bars of the frame 8 are channeled or otherwise formed so as to hold between them the plates 11 and 12 of wood fiber or like insulating material. The upper plate 11 is formed with a plurality of perforate openings 13, these openings being arranged in the form of a square or in any other suitable manner. The lower plate 12 is also of wood fiber or other nonconducting material and is formed with a plurality of recesses 14, the upper wall of each recess being perforated as at 15, each perforation 15 being adapted to register with the perforations in the upper fiber plate as illustrated most clearly in Fig. 7. Disposed within each recess 14 is a metal shell designated 16. Passing through each of the perforations 13 and the corresponding perforation 15 of the recess 14 is the shank 17 of a contact member. This shank 17 at its end is screw threaded for engagement with the brass contact point or head designated 18. Disposed against the inner wall of each recess is a washer 19 and disposed between the head 18 and this washer is a coil spring 20, this spring acting to force the contact point out. The shell 16 is inwardly flanged at its outer end as at 21 and the head or point 18 is provided with a flange 22 which contacts with this flange 21 when the contact member is projected, the flange 21 acting to limit the outward movement of the head 18. It will be obvious now that when the contact member formed by the plates 11 and 12 is brought down adjacent to the contact member formed by the metal sheet 6 the contact points will be forced inward or will yield so as to provide a yielding engagement between the contact points and the metal sheet and that as the plates 11 and 12 are raised the contact points will be projected by the springs. This provision of yielding contact points prevents any shock or jar incident to the engagement of the points with the contact sheet and further prevents the puncturing or indenting of the metal sheet and injury to the contact points. Each of the shanks 17 is formed with an eye 23 at its upper end to which a wire 24 is attached, this wire leading from the contact point to one of the lamps in the sign. The sheet 6 is electrically connected to a source of electric current and the lamps are suitably connected in an interrupted circuit with said source of current so that when any one of the contact points 18 is forced into contact with the contact sheet 6 that particular lamp to which the contact point is connected will be energized and flashed.

The insulation disposed within the frame 8 is formed in two sections or plates in order to cheapen the construction of the contact point carrier and permit it to be more readily manufactured. These fiber plates are relatively thin and in order to secure sufficient thickness for the proper support of the pins it is necessary to superpose two plates. Furthermore, this secures the requisite rigidity for the insulation, inasmuch as if only one fiber plate were used the plate being relatively thin would be inclined to sag at the middle.

For the purpose of reciprocating the frame 8 which supports the movable contact member we provide a transversely extending shaft 25 which is mounted in any suitable manner upon the frame of the machine and which is disposed nearly beneath the middle of the contact member 6. This shaft is provided at opposite ends with angular levers 26 each lever having an arm extending approximately in a horizontal plane, this arm being designated 27, and a downwardly extending arm designated 28. The arms 27 of both of the levers are connected by means of links 29 to the frame 8. as illustrated clearly in Fig. 1. These links 29 are pivoted each at its lower end to the arm 27 of the corresponding lever 26 and each link is pivoted at its upper end to a plate 30 held upon the frame 8 by means of bolts 31 or screws which pass through slots 32 in the plate 30. These vertical slots 32 permit the frame 8 to be adjusted relative to the plate 30 and thus permit the adjustment of the frame 8 with relation to the contact plate 6. The shaft 25 is a rock shaft and it will be noted that as the shaft 25 oscillates the frame 8 will be reciprocated vertically.

For the purpose of oscillating the rock shaft 25 and reciprocating the frame 8 we provide a mechanism, illustrated in Figs. 4 and 5. Pivotally mounted upon the side bars 3 of the frame on each side of the machine and swingingly depending therefrom is an eccentric yoke 33. At its lower end this eccentric yoke is formed with a forwardly projecting lug 34 to which is pivoted a link 35 which, in turn, is pivoted as at 36 to the depending arm of the lever 26. Preferably this link 35 is formed in two sections longitudinally adjustable with relation to each other and as illustrated, the section 35ª is interiorly screw threaded for engagement with a coupling 37 carried upon the section 35. When this coupling is rotated in one direction the link 35 will be shortened and when rotated in the other direction it will be lengthened. The purpose of this adjustable link will appear more clearly hereafter. The eccentric yokes 33 are normally concentric and loosely surround the ends of a transverse shaft 38. This shaft 38 is provided at one point in its length with a cam 39 which is adapted to engage with a cam 40 on a trip shaft 41 the purpose of which will be later stated. The shaft 38 is continuously rotated in one direction by means of a worm wheel 42 mounted upon the shaft as illustrated in Fig. 6 and engaging with a worm 43 mounted upon a longitudinally extending shaft 44 which constitutes the driving shaft of the machine as seen clearly in Figs. 1 and 3. This shaft 44 carries at its end a pinion 45 which meshes with a gear wheel 46 carried upon the motor shaft 47. This motor shaft is in turn driven by any suitable motor such as an electric motor 48. The worm wheel and worm are inclosed in the housing 49 as seen clearly in Figs. 3 and 6. Mounted upon the extremity of the shaft 38 is a crank arm 50 carrying at its extremity a laterally projecting pin 51 upon which the roller 52 is mounted. This roller moves within the plane of the cam yoke 33. The interior face of the cam yoke 33, as illustrated in Figs. 4 and 5, is formed with two arc-shaped portions 53 and 54, these arc-shaped portions being offset with relation to each other. The two portions 53 and 54 are connected to each other by means of the shoulders 55 and 56 which are disposed in diametrically opposite relation. The periphery of the cam yoke is also formed opposite the shoulder 56 with a projecting shoulder or tooth 57 adapted to be engaged by the tooth of a detent 58 mounted upon the shaft 41. This detent 58 constitutes a latch preventing any forward movement of the eccentric yoke 33 and of the link 35 as illustrated in Fig. 5. The arm 50 upon the rotation of the shaft 38 in the direction of the arrow on Fig. 4, carries the roller 52 into engagement with the shoulder 56 and as a consequence the eccentric yoke will be shifted rearward and eventually engaged by the detent 58 as illustrated in Fig. 5. The roller 52 will ride over the shoulder 56 as the shaft 38 revolves and it will engage the inner face 53 of the eccentric yoke until it arrives at the shoulder 55. At this point the cam 39 on the shaft 38 will engage the cam 40 and rock the shaft 41 so as to carry the latch detent 58 out of its engagement with the shoulder 57 whereupon the continued movement of the arm 50 will cause the roller to positively engage the inner face 54 of the eccentric yoke and will shift it forward. The forward movement of the yoke 33 will cause the lifting of the frame 8 while the rearward movement of the yoke 33 will cause a depression of the frame 8. The frame will be held in depressed position until such time as the latch 58 is tripped.

To secure a very quick upward movement of the frame 8 so as to carry the contact members mounted thereon quickly out of engagement with the contact sheet 6, we provide a spring 63 which resists the downward movement of the frame 9 and which, as soon as the latch 58 is released, acts to urge the frame 8 upward. As illustrated, each of the levers 26 has attached to its downwardly extending arm an upwardly and rearwardly extending rod 60 which at its lower end is pivoted on a pin 61 on the lower end of the arm 28 and which at its upper end passes loosely through a perforation in a bracket 62 fastened to the main frame of the machine. Surrounding this rod 60 is a coil spring 63 which abuts at its lower end against the enlarged eye whereby the rod is pivoted to the arm 28 and at its upper end abuts against the face of the bracket 62. It will, therefore, be seen that upon a downward movement of the frame 8 the arms 28 will be shifted rearwardly and will compress the springs 63 and that upon a release of the latch 58 these springs 63 will shift the arms 28 forwardly, thus quickly raising the frame 9 supporting the movable contact members. This is particularly necessary in order to break contact quickly between the movable contact portions carried on the frame 8 and the contact sheet 6. It will be seen, however, that the roller 52 traveling upon the inner face of the yoke will cause this yoke to positively reciprocate and thus will cause a reciprocation of the frame 8 in case the spring is too weak.

In order to cushion the machine from shock or jar incident to the quick upward movement of the frame 8, we provide the air cushioning chamber 64, shown in Figs. 1 and 2, supported upon brackets 65 mounted upon the frame of the machine and connected to the lower end of the arm 28 of the lever 25 is a piston rod 66 which passes into this cushioning chamber and carries at its end a piston 67. There are two of these cushioning chambers 64, one on each side of the machine, each having a piston rod connected to the lower end of each lever 26 and each of these cushioning chambers is provided with a small aperture constituting an inlet and outlet aperture. Inasmuch as this aperture is relatively small the outward passage of air will be retarded and hence the piston 67 will be cushioned.

As before stated, the flashing of the lamps is secured by means of a perforated strip of heavy paper or other non-conducting material which will be later described. This strip is intermittently moved forward at the time that the frame 8 is raised and is then held from further forward movement while the frame is lowered and the contact points carried by the frame are in contact with the contact plate 6. To this end we provide a shaft 68 mounted in suitable bearings upon the frame of the machine and extending parallel to the shaft 38. This shaft carries upon it at one end the gear wheel 69 the periphery of which is toothed. Mounted upon the shaft 38 is a gear wheel 70, one half of whose periphery is toothed as at 71 for engagement with the teeth of the gear wheel 69. It will be obvious now that a rotation of the wheel 70 from the position shown in Fig. 1, will cause a rotation of the gear wheel 69 through half a revolution and that then the bare portion of the wheel 70 will be opposite the toothed wheel 69 and that the wheel 69 will remain stationary until the teeth 71 again engage with the teeth on the wheel 69. Thus while the shaft 38 is continuously rotated the shaft 68 will be intermittently rotated.

Mounted upon the shaft 68 is a cylinder 72 having a width equal to or somewhat greater than the width of the perforated sheet or strip used for controlling the lamps. This cylinder 72 at opposite points in its diameter is longitudinally slotted as at 73 and disposed in each of these slots is a transversely extending rod 74, a detail view of this construction being illustrated in Fig. 9. Each of the slots 73 is bridged at two points by means of a bridge plate 75 and each of the bars 74 is provided at two points with the upwardly projecting pins 76 which are adapted to be projected through perforations in these bridging strips 75, these pins being screw threaded into or otherwise mounted upon the bar 74. Mounted in the bottom of each of the slots 73 at opposite ends of the cylinder are the vertical guide pins 77 which pass through perforations formed in the bar 74 and surrounding these guide pins are the springs 78 which bear at their ends against the bottoms of the slots 73 and the inner faces of the bars 74, these springs acting to force the bars upward to such an extent that the pins 76 will project a distance beyond the outer face of the cylinder.

A controlling strip of paper, designated 79, is formed at intervals with perforations through its sides designated 80, these perforations being surrounded by reinforcing washers 81, as illustrated in Fig. 10. The pins 76 are adapted to pass through these perforations 80 and so engage with the paper strip as to draw it over the surface of the aluminum plate 6 as the cylinder 72 revolves. It is necessary to strip the paper sheet or strip from the cylinder 72 and to this end we provide the fixed cams 82 which are adjustably mounted upon brackets 83 depending from the main frame of the machine as illustrated in Fig. 9, these fixed cams 82 having rounded upper faces 84 which are adapted to engage with the projecting ends of the bars 74, the cams being mounted vertically in line with and beneath the shaft 68. Thus in the course of the rotation of the cylinder 72 each of the bars 74 will come into engagement with the cams 82 and the bars 74 will be forced inward to the bottom of the corresponding slot 73, thus withdrawing the pins 76 from their engagement with the sheet 79 and stripping the sheet from these pins so that the sheet, band or strip 79 will pass down into a magazine or container 86 disposed beneath the bottom of the machine. A sheet guide 85 extends parallel to the circumference of the cylinder from a point in front of the cylinder to a point beneath the fixed cams 82 as illustrated in Fig. 3. While we have illustrated this particular form of stripping means comprising the bars 74 and the cams 82, we wish it understood that we need not be limited to this form as other means may be provided for stripping the film or sheet 79 from the cylinder 72. The gear wheels 69 and 70 are so arranged with relation to the remainder of the apparatus that when the yoke 51 is pushed rearward to the position shown in Fig. 5 and the movable frame 8 has been drawn down, the beginning of the stripped portion of the wheel 70 is opposite the teeth on the wheel 69. Just as the roller 52 reaches the shoulder 59 on the yoke the catch 58 is released as before stated and the springs 63 throw the yoke forward and throw the contact carrying frame up, breaking the lamp circuits. Just at this time the wheel 70 has made its half revolution while the cylinder 72 remains stationary, and as the frame 8 moves upward the toothed portion of the wheel 70 begins its engagement with the teeth on the wheel 69 and the cylinder is given another half revolution, the pegs or pins 76 taking the strip or sheet 79 along for a predetermined distance. Thus every time that the contact carrying frame 8 rises the strip or sheet 79 is shifted longitudinally over the aluminum plate 6 a distance equal to one half the circumference of the cylinder 72. It will be noted that the fixed cams are vertically adjustable. This is secured by vertically slotting the brackets 83 and attaching the cams 84 to the brackets by means of bolts 84ª, as illustrated in Fig. 9. By shifting the cams 82 upward or lowering them, the bars 74 may be shifted inward any required distance to strip the pins 76 from the sheet 79. The film or sheet 79 passes into the box or magazine 86 as illustrated in Fig. 1 and then passes out of this magazine and over suitable rollers 87 and upward over an apron 88 mounted in front of the machine. The film then passes under a guide roller 89 and then over the aluminum plate 6 as before stated and under the roller 89$^a$. Thus the film sheet or strip 79 is constantly passing through the machine and each portion of the strip will pass at predetermined intervals between the aluminum plate and the movable contact points.

As illustrated in Fig. 10, the sheet 79 is formed with perforations 79$^a$ which are so arranged as to cause the contact points which pass through these perforations and make contact with the plate 6, to flash such lamps as will produce any desired design or letter. We have illustrated the contact frame as carrying four hundred and one contact points 18. The sign for use with a contact frame carrying four hundred and one points has four hundred lights arranged in sixteen units of twenty-five lamps, the lamps of each unit being arranged within a rectangle. It will be obvious that by energizing these lamps according to certain combinations that the letters of the alphabet or any other suitable design may be formed and that the letters will change with the change in position of the perforations 79$^a$ on the sheet 79. As will be seen from Fig. 2 the non-conducting slabs 11 and 12 contain four hundred and one of the contact members 56. Four hundred of these contact points, as before stated, are to control the four hundred lamps in the reading portion of the sign while the four hundred and first contact member, which is designated 17$^a$, is for the purpose of controlling a circuit making and breaking means for the border lamps. A relatively heavy current has to be carried for the border lamps, much heavier than the current used for the lamps defining letters in the body of the sign, and it would be impossible for this heavy current to be interrupted and established again through one of the contact members 17 and 18 previously described. Means are, therefore, provided whereby the breaking of the circuit through the contact member 17$^a$ will actuate a switch causing a breaking of the current through the border lamps.

The mechanism whereby the current is broken is illustrated in Fig. 8. As illustrated therein, 90 designates a solenoid magnet, and 91 and 92 designate steel cores movable into or out of the solenoid magnet. The core 92 is mounted upon an arm 93 which is pivoted at 94 in any suitable manner and which at its lower end is formed with a relatively large eye 95. Disposed in and shiftable through this eye is a contact plug 96 which has a relatively broad face. The lower end of the arm 93 is formed with an eye 97 and a wire 98 extends through this eye to the inner end of the plug. The core 91 is also mounted in a pivoted arm 102, corresponding to the arm 93 and pivoted at 103. The lower end of the arm 102 is formed with an eye within which is shiftably mounted the contact plug 104, corresponding to the contact plug 96, the contact plug being connected to the lower end of the arm 102 by means of the wire 105, corresponding to the wire 98. The contact plugs 96 and 104 are adapted to be brought in contact with common carbon terminals 99 and 99$^a$ which are supported in sockets 100. The carbons are held in place in these sockets by means of set screws 101 or any other suitable means. These carbons are connected in circuit with a source of electric current for the border lamps as will be later stated. Disposed against the arms 93 and 102 are the springs 106. The middle portion of each spring is clamped to the corresponding arm 93 or 102 by means of a clamp 107. The upper ends of the springs 106 bear against the adjacent ends of the magnet 90 while the lower ends of the springs 106 bear against the lower ends of the arms 93 and 102 engaging the plugs 96 and 104 to hold them extended. The action of the springs 106 is to urge the upper ends of the arms 93 and 102 outward and withdraw the cores 91 and 92 from the solenoid. These springs 106 also resist any inward movement of the plugs 96 and 104 through the eyes 95 when the plugs engage the contacts 99 and 99$^a$. The arms 93 and 102 are connected by means of the wire 108 which is connected to the clamps 107. Thus current passing into one of the arms as for instance the arm 102, will pass up this arm to the wire 108, then pass along this wire 108 to the opposite arm 93 and from this to the plug 96 and out by way of the carbon terminal 99. When the magnet 90 is energized by a passage of current therethrough, it will attract the cores 91 and 92, drawing the upper ends of the arms 93 and 102 inward and forcing the contact plugs 96 and 104 against the carbon terminals 99. By reason of the springs 106 the plugs 96 and 104 will have to contact with these carbon terminals. As soon as the magnet 90 is de-energized the upper ends of the springs 106 will act to force the upper ends of the arms 93 and 102 outward, breaking electrical contact between the plugs 96 and 104 and the carbons 99. The carbons 99 are connected in circuit with a source of current for the border lamps and, therefore, as soon as the circuit through the magnet has been broken the circuit through the wires leading to the border lamps will be broken.

In Fig. 11, we illustrate diagrammatically the circuits of the letter lamps and the circuit in which the border controlling mechanism illustrated in Fig. 8 is placed. Referring to this figure, A designates the border lamps and B the letter units which are composed of twenty-five lamps or any other suitable number. The lamps of the border A are connected at one side to a conductor a leading to the solenoid magnet 90 and on the other side to the carbon terminal 99. The other end of the magnet coil is connected to a conductor c which leads to the contact member 17ª. A conductor d leads from the dynamo C to the aluminum contact plate 6. A return wire h leads from the conductor a to the negative brush of the dynamo C. A conductor e leads from the conductor d to the carbon terminal 99ª. Now when the frame 8 moves so as to bring the contact point 17ª into contact with plate 6 current will pass from the dynamo along wire d to the plate, thence through contact member 17ª along wire c through the magnet 90 to wire a, thence to return wire h, and thence back to the dynamo. Thus the solenoid will be energized whenever contact point 17ª electrically engages plate 6. As soon as the solenoid magnet 90 is energized, the contact plugs 96 and 104 will be brought in contact with terminals 99 and 99ª and current will pass from wire d to wire e to terminal 99ª, thence to arm 102, through wire 108 to arm 93 to terminal 99, thence by wire b through the border lamps A and thence by wire a to return wire h. Each lamp in each unit B is connected on one side to one of the contact points 17 by wire f and each lamp of a unit is connected on the other side to a common return wire g which is electrically connected to the return wire h. It will be seen now that as the contact carrying frame 8 is shifted toward the contact plate 6 those contact points which are in alinement with perforations on the paper strip 79 will be brought into contact with the aluminum plate 6 and will be flashed. At the same time the circuit through the solenoid magnet 90 will be closed which will close the circuit through the border lamps. As soon as contact is broken between the contact members 17 and the plate 6, the lamps of the units will go out and at the same time the circuit through the solenoid magnet will be broken and springs will act to retract the contact plugs 96 and 104 from the contacts 99 and 99ª, thus breaking the circuit through the border lamps. The breaking of the circuit through the carbons 99 and 99ª breaks the heavy current which energizes the border lamps and the carbons take the arc. It is to be understood that one or any number of solenoid switches such as illustrated in Fig. 8 can be controlled in this manner, each switch being independent of the other, and each controlled by a small contact point 17ª in the contact point carrying frame. It will be understood that the construction illustrated in Fig. 8 is only for the purpose of controlling the border lamps or the lamps used for other spectacular display. As the contact points in the contact frame are small they would not carry the necessary heavy current to operate the border lamps. It is necessary, therefore, to use a small amount of current in the magnet winding to keep the breaking current down as low as possible to avoid arcing at the contact points.

As an alternating current is used for the electric lights, the engagement between the movable contact points and the contact plate or fixed contact must be clean and good. It is for this reason that the contact screen is employed over the aluminum plate as the contact points in passing through the meshes of this screen to engage the plate will also engage anywhere from one to four sides of the opening in the screen through which they pass, as well as the plate, thus always insuring a good contact. The paper strip controlling the circuits always contains a certain amount of lint from the punching of the perforations which would collect under the contact points and between them and the plate and obstruct the contact if the bare plate itself were used. Although the screen collects this lint it is not sufficient to prevent contact either with the screen or with the plate if blown away from time to time by a hand bellows or other suitable device.

Having described our invention what we claim is:

1. A circuit controlling mechanism of the character described, including oppositely disposed confronting contact members, one of said contact members including a plurality of contact points, a perforated controlling sheet passing between said contact members, power operated means for shifting the contact members toward each other, holding them in electrical engagement for a predetermined length of time and instantaneously releasing them, resilient means for shifting said contact members quickly out of electrical engagement when released, and means for shifting the controlling sheet longitudinally between the contact members when the contact members are separated.

2. A circuit controlling mechanism of the character described, including oppositely disposed contact members movable into and out of electrical engagement with each other, and connected in an open circuit with each other, a controlling sheet movable intermittently between said contact members, power operated means for relatively shifting the contact members into electrical engagement with each other, resilient means for urging the contact members out of engagement with each other, means for shifting the said sheet forward a predetermined distance when the contact members are separated, and means for cushioning the movable contact member against jar as it moves outward under the force of the said resilient means.

3. In a circuit controlling mechanism of the character described, oppositely disposed contact members, one of said members being fixed and the other movable into and out of electrical engagement with the first named member, one of said members having the form of a metallic sheet and the other including a plurality of insulated contact points, a perforated endless controlling sheet of insulating material passing between the contact members, means for reciprocating said movable contact member into and out of electrical engagement with the contact sheet, a rotating cylinder over which the perforated sheet loosely passes, means on the cylinder for engaging the perforated sheet, and means for stripping the perforated sheet from the cylinder.

4. In a circuit controlling mechanism of the character described, oppositely disposed contact members, one of said members being fixed and the other movable into and out of electrical engagement with the first named member, one of said members having the form of a metallic sheet and the other including a plurality of insulated contact points, a perforated controlling sheet of insulating material passing between the contact members, means for reciprocating said movable contact member into and out of electrical engagement with the contact sheet, a rotating cylinder over which the perforated sheet passes, means on the cylinder for engaging the perforated sheet, means for stripping the perforated sheet from the cylinder, and means for intermittently rotating the cylinder through a predetermined angular distance.

5. In a circuit controlling mechanism of the character described, oppositely disposed contact members, one of said members being movable into and out of electrical engagement with the other, and one of said members including a plurality of insulated contact points, a perforated controlling sheet passing between the contact members, bell crank levers which have one arm operatively connected to the movable contact member, means operatively connected to the other arm of each bell crank lever for oscillating the bell crank lever, springs urging the contact members apart, and cushioning devices connected to said bell crank levers and resisting the action of said springs.

6. In a circuit controlling mechanism of the character described, a supporting frame, a fixed contact member mounted thereon, guides projecting upward from the frame, a movable contact member mounted on said guides, means for reciprocating said movable contact member on the guides toward and from the fixed contact member, springs acting to urge the movable contact member away from the fixed contact member and cushioning devices resisting said outward movement of the movable contact member.

7. In a circuit controlling mechanism of the character described, a fixed contact member, a contact member movable into and out of engagement with the fixed member, means for drawing the movable contact member into electrical engagement with the fixed contact member, a latch for holding the movable contact member in such electrical engagement, means for releasing said latch after a predetermined time, and means for then shifting the movable contact member out of engagement with or away from the fixed contact member.

8. In a circuit controlling mechanism of the character described, oppositely disposed contact members, one movable toward or from the other contact member, springs urging the movable contact member outward or away from the fixed contact member, means for intermittently shifting the movable contact member into electrical engagement with the fixed contact member, a latch engageable with the shifting means for holding the movable contact member in such electrical engagement, means for releasing the latch to permit the springs to separate the contact members, a perforated controlling sheet disposed between the contact members, and means for intermittently shifting said sheet during the time that the contact members are separated.

9. In a circuit controlling mechanism of the character described, a supporting frame, a contact member mounted upon the frame, upstanding guides on said frame, a contact member mounted upon said guides for movement toward and from the fixed contact member, springs acting to separate the contact members, an eccentric yoke pivotally mounted upon the main frame, a bell crank lever operatively connected to the movable contact member and to the eccentric yoke, a shaft passing through the eccentric yoke, an arm on the shaft engaging said yoke to oscillate the latter, a perforated controlling sheet of insulating material passing between the contact members, and means for intermittently shifting said sheet a predetermined distance during the time that the contact members are separated.

10. In a circuit controlling mechanism of the character described, a supporting frame, a contact member mounted upon the frame, upstanding guides on said frame, a contact member mounted upon said guides for movement toward and from the fixed contact member, springs acting to separate the contact members, an eccentric yoke pivotally mounted upon the main frame, a bell crank lever operatively connected to the movable contact member and to the eccentric yoke, a shaft passing through the eccentric yoke, an arm on the shaft engaging said yoke to oscillate the latter, a latch holding said yoke in a retracted position, means for intermittently releasing said latch, a perforated controlling sheet passing between the contact members, and means coordinated with said shaft for shifting said controlling sheet a predetermined distance during the period that the movable contact member is separated from the fixed contact member.

11. In a circuit controlling mechanism of the character described, a supporting frame, a contact member mounted upon said frame, a contact member mounted on said frame and movable toward and from the first named contact member, oppositely disposed bell cranks pivotally supported upon the frame and each having one arm thereof operatively connected to said movable contact member, a shaft, means for constantly rotating the shaft, oppositely disposed eccentric yokes pivotally mounted upon the frame and surrounding the ends of the shaft, crank arms on the shaft engaging the eccentric yokes to reciprocate them, spring actuated latches engaging said eccentric yokes upon the extremity of their rearward movement, means operatively connecting the eccentric yokes to the bell crank levers, springs urging said contact members apart, means on the shaft for intermittently tripping said latches to permit the yokes to swing forward and the movable contact member to separate from the fixed contact member under the action of said springs, a perforated controlling sheet of insulating material passing between the contact members, and means actuated by said shaft for intermittently shifting the controlling sheet a predetermined distance while the contact members are separated.

12. A circuit controller of the character described, including oppositely disposed contact members movable into and out of electrical engagement with each other, a perforated controlling sheet of insulating material disposed between the contact members, means for shifting the contact members toward and from each other, means for shifting the controlling sheet intermittently between the contact members, said means including a cylinder having a plurality of longitudinally extending grooves, a bar carried in each groove, springs urging the bars outward, pins mounted upon the bars and engaging with the perforated sheet, and means disposed at one point in the path of rotation of said bars, to engage each bar depressing it into the corresponding grooves to thereby disengage the sheet from said pins.

13. A circuit controller of the character described, including oppositely disposed contact members movable into and out of electrical engagement with each other, a perforated controlling sheet of insulating material disposed between the contact members, means for shifting the contact members toward and away from each other, means for shifting the controlling sheet intermittently between the contact members, including a cylinder having a plurality of longitudinally extending grooves in its periphery, bridging pieces extending across said grooves, each bridging piece being perforated, a bar mounted in each groove and having upstanding pins engageable in perforations in the controlling sheet, said pins passing each through the perforation in one of the bridging pieces, springs urging the said bars outward, and means disposed in the path of travel of said bars acting to successively depress the bars and to thereby strip the pins from said perforated sheet.

14. In a circuit controller of the character described, opposed contact members, one of said members comprising a metallic sheet and the other of said members including a plurality of insulated contact points, a metallic netting disposed upon said sheet, and means for shifting the contact members into and out of electrical engagement with each other.

15. In a circuit controller of the character described, a supporting main frame, a contact member comprising a metallic sheet supported upon said frame, a contact member slidingly supported upon said main frame and including an inclosing frame, upper and lower plates of insulating material mounted in said frame, the lower plate being formed with a plurality of recesses and the upper plate with a plurality of perforations extending into said recesses, pins disposed in said recesses and perforations and each having an aluminum head on its inner end adapted to make electrical engagement with the contact sheet, springs disposed in said recesses and urging said pins outward, and stops limiting the outward movement of said pins.

16. The combination with two banks of electric lamps, and a source of energy with which said banks are separately connected in normally interrupted circuits, of means including a relay for intermittently completing the circuit through one of said banks of lamps, and means independent of the relay and controlled by said first-named means for simultaneously completing the circuit through the other of said banks of lamps.

17. The combination with two banks of electric lamps, the lamps of one bank being each independently electrically connected in interrupted circuit with a source of energy and the lamps of the other bank being all connected in a common interrupted circuit with a source of energy, of means for intermittently closing a circuit through both banks of lamps simultaneously.

18. The combination with a bank of electric lamps connected in parallel in interrupted circuit with a source of energy, an electrically actuated switch disposed at such interruption and adapted in itself to establish or disestablish a circuit through the lamps, means for actuating said switch including contact members, means for shifting said contact members into and out of electrical engagement with each other, said means being connected in an interrupted circuit with a source of power, and power actuated means for intermittently closing the circuit through said actuating means and said source of power.

19. The combination with an electric lamp and a source of energy in circuit therewith, of contacts movable into and out of electrical engagement with each other, power-operated contact movement controlling means, an electrically actuated switch for in itself making or breaking the circuit between said lamp and the source of energy, and means controlled by the completion of the circuit through said contacts for actuating said switch to complete a circuit through the lamp.

20. The combination with two banks of electric lamps and a source of energy, of a controlling mechanism therefor including a plurality of contact points, one for each of the lamps in one bank, a common contact member, said member, the contact points and said lamps being electrically connected in a normally interrupted circuit with the source of energy, means for intermittently shifting the contact points into engagement with the common contact, a contact point operatively connected to the first-named contact points to shift therewith into and out of engagement with the common contact, an electric switch connected in circuit with the other of said banks of lamps and said source of energy, and an electrically operated switch actuating means connected in circuit with said source of energy, said common contact and the last-named contact point.

21. A circuit controlling mechanism of the character described including oppositely disposed contact members, one of which is movable into and out of engagement with the other with which it is connected in an open circuit, a controlling sheet movable between said contact members, means for moving the movable contact member into and out of engagement with the other, means for cushioning its movement away from the fixed contact member, and means for cushioning the movement of the movable contact member toward the fixed contact member, said latter means also causing a quick movement of the movable contact member away from the fixed contact member.

22. The combination with two banks of electric lamps and a source of energy with which said banks are separately connected in independent circuits, of a relay in the circuit of one bank of lamps normally opening such circuit, a normally open circuit independent of either lamp circuit controlling the relay, and means for simultaneously completing the controlling circuit and the circuit through one of the banks of lamps.

23. A circuit controlling mechanism including a source of electrical energy, a bank of lamps, a relay, a circuit through the source of energy, bank of lamps and the relay which normally holds the otherwise closed circuit open, a relay controlling circuit normally open, a second bank of lamps, each in an independent normally open circuit, and means for simultaneously closing the relay controlling circuit and the circuits of any predetermined lamps of the second bank.

24. A circuit controlling mechanism including a source of electrical energy, a bank of lamps, a relay, a circuit through the source of energy, bank of lamps and the relay which normally holds the circuit open, a relay controlling circuit normally open, a second bank of lamps, each in an independent normally open circuit, and means for simultaneously closing the relay controlling circuit and the circuits of any predetermined lamps of the second bank, said means including a contact common to all circuits, a plurality of contacts, one for each circuit, means for simultaneously moving the plurality of contacts into and out of engagement with the fixed contact, and means interposed between the plurality of contacts and fixed contact to selectively determine which of the plurality of contacts shall electrically engage the fixed contact.

25. A circuit controlling mechanism including a source of electrical energy, a bank of lamps, a relay, a circuit through the source of energy, bank of lamps and the relay which normally holds the circuit open, a relay controlling circuit normally open, a second bank of lamps, each in an independent normally open circuit, means for simultaneously closing the relay controlling circuit and the circuits of any predetermined lamps of the second bank, said means including a contact common to all circuits, a plurality of contacts, one for each circuit, means for simultaneously moving the plurality of contacts into and out of engagement with the fixed contact, and means interposed between the plurality of contacts and fixed contact to selectively determine which of the plurality of contacts shall electrically engage the fixed contact, said means including a strip of insulating material having perforations arranged in predetermined positions for the passage of predetermined movable contacts.

26. A circuit controlling mechanism including a source of electrical energy, a bank of lamps, a relay, a circuit through the source of energy, bank of lamps and the relay which normally holds the circuit open, a relay controlling circuit normally open, a second bank of lamps, each in an independent normally open circuit, means for simultaneously closing the relay controlling circuit and the circuits of any predetermined lamps of the second bank, said means including a contact common to all circuits, a plurality of contacts, one for each circuit, means for simultaneously moving the plurality of contacts into and out of engagement with the fixed contact, and means interposed between the plurality of contacts and fixed contact to selectively determine which of the plurality of contacts shall electrically engage the fixed contact, said means including a strip of insulating material having perforations arranged in predetermined positions for the passage of predetermined movable contacts, and means acting in timed relation to the contact moving means for moving the strip to position different portions of it between the plurality of contacts and the fixed contact.

In testimony whereof we affix our signatures in presence of two witnesses.

WILBERT A. WILLOWER. [L. S.]
CHARLES W. ANGELL. [L. S.]
JAMES W. GALLASPIE. [L. S.]

Witnesses:
MARY FITZGERALD,
S. H. CHAPMAN.